J. P. BUCKLEY AND A. E. LARD.
MACHINE FOR ASSORTING AND COUNTING PAPER MONEY.
APPLICATION FILED JULY 12, 1916. RENEWED JUNE 5, 1919.
1,328,263.
Patented Jan. 20, 1920.
8 SHEETS—SHEET 1.
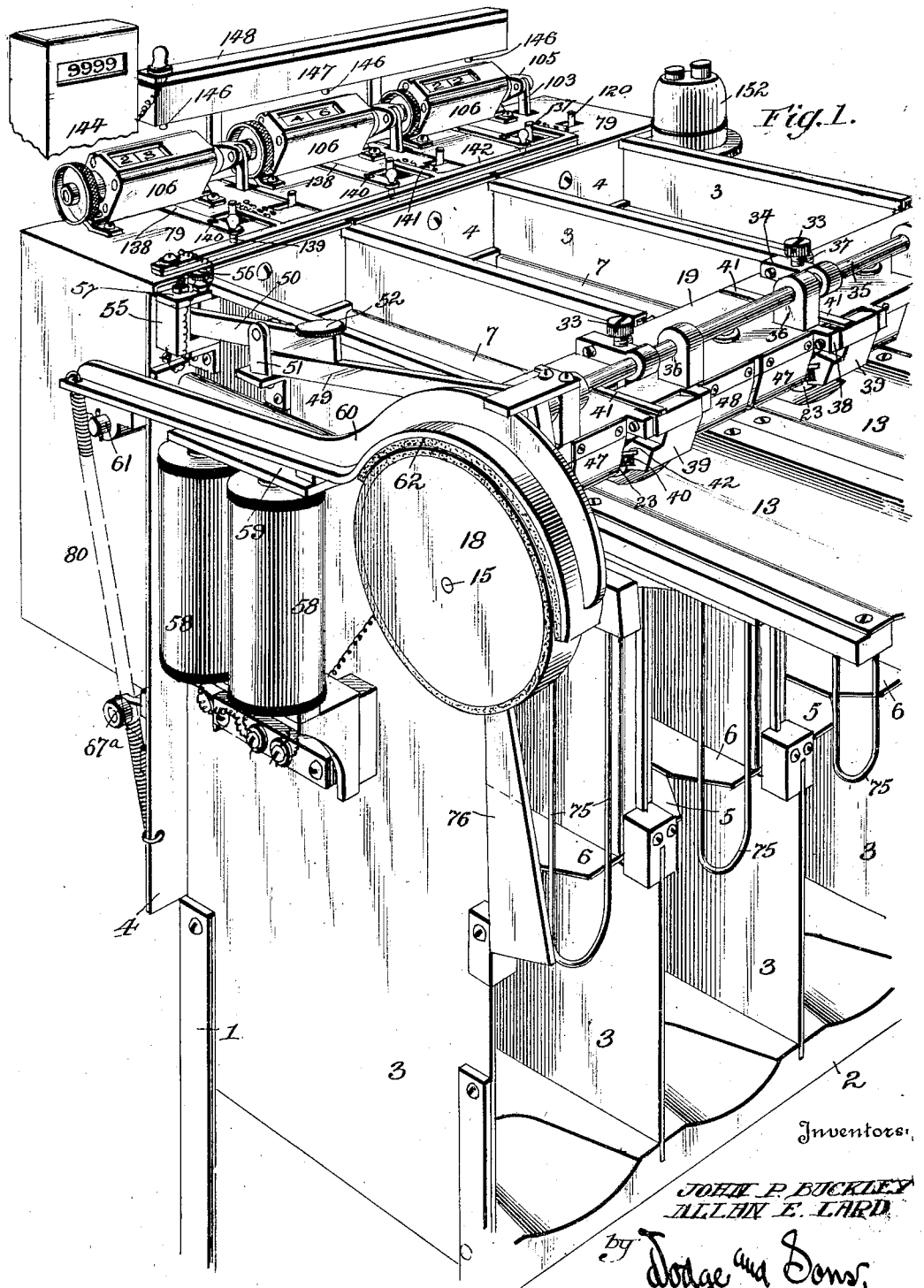

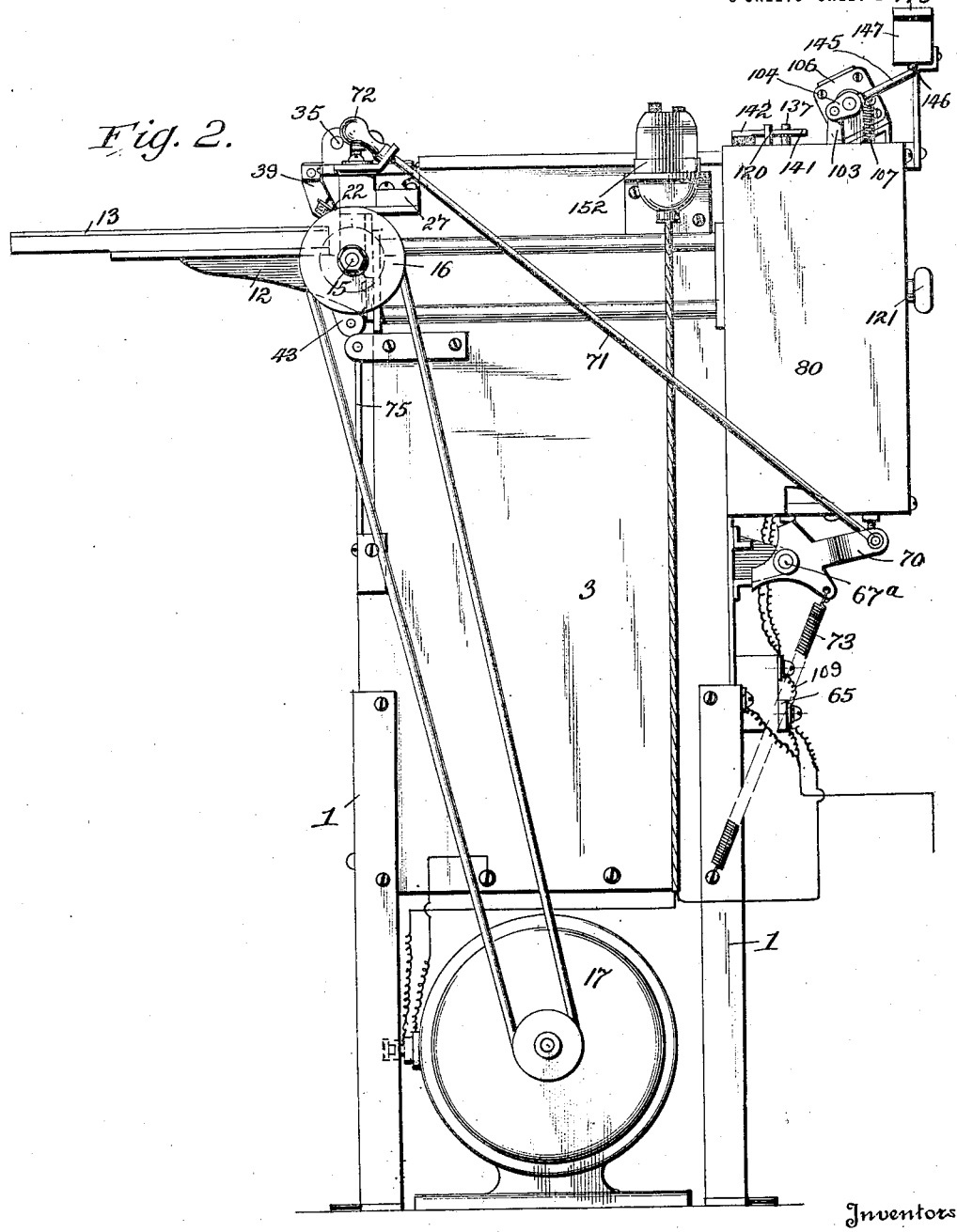

J. P. BUCKLEY AND A. E. LARD.
MACHINE FOR ASSORTING AND COUNTING PAPER MONEY.
APPLICATION FILED JULY 12, 1916. RENEWED JUNE 5, 1919.
1,328,263.
Patented Jan. 20, 1920.
8 SHEETS—SHEET 3.
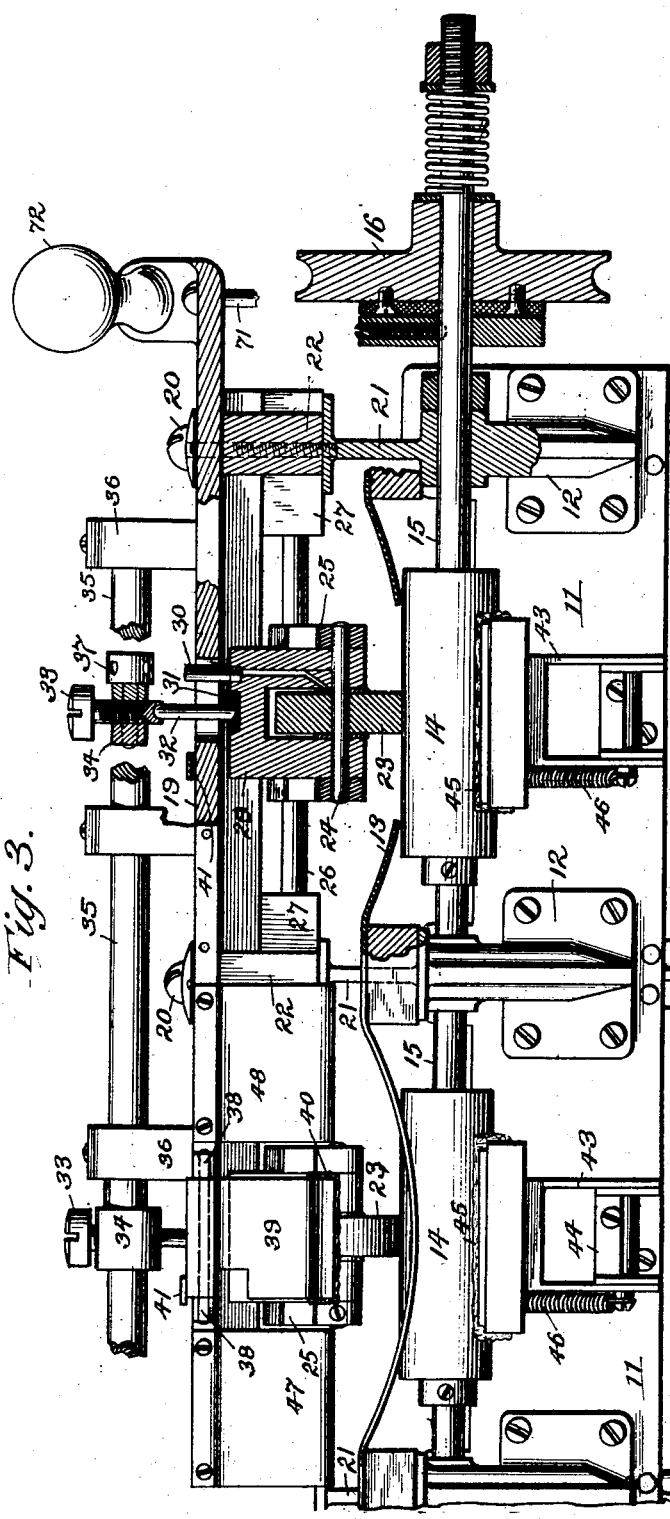
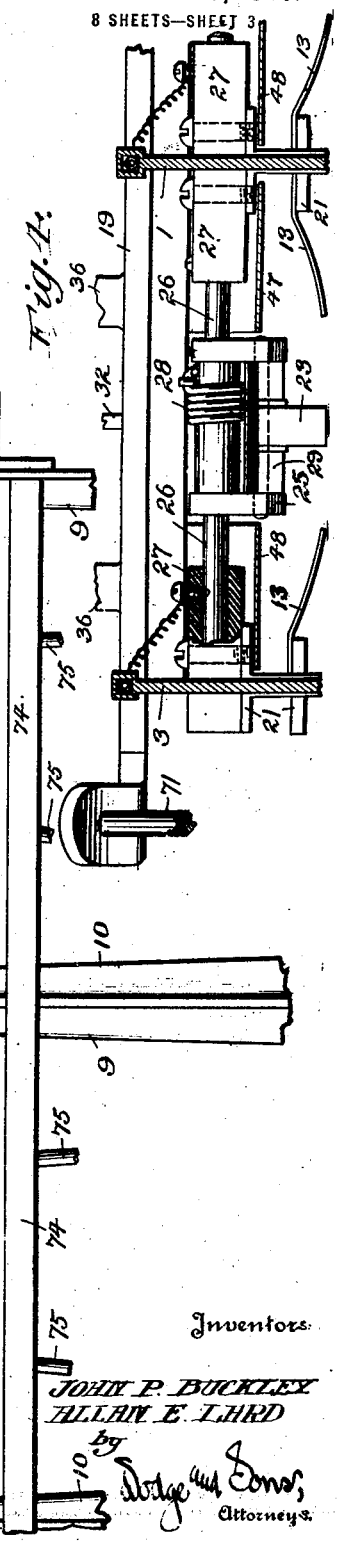

J. P. BUCKLEY AND A. E. LARD.
MACHINE FOR ASSORTING AND COUNTING PAPER MONEY.
APPLICATION FILED JULY 12, 1916. RENEWED JUNE 5, 1919.
1,328,263.
Patented Jan. 20, 1920.
8 SHEETS—SHEET 4.
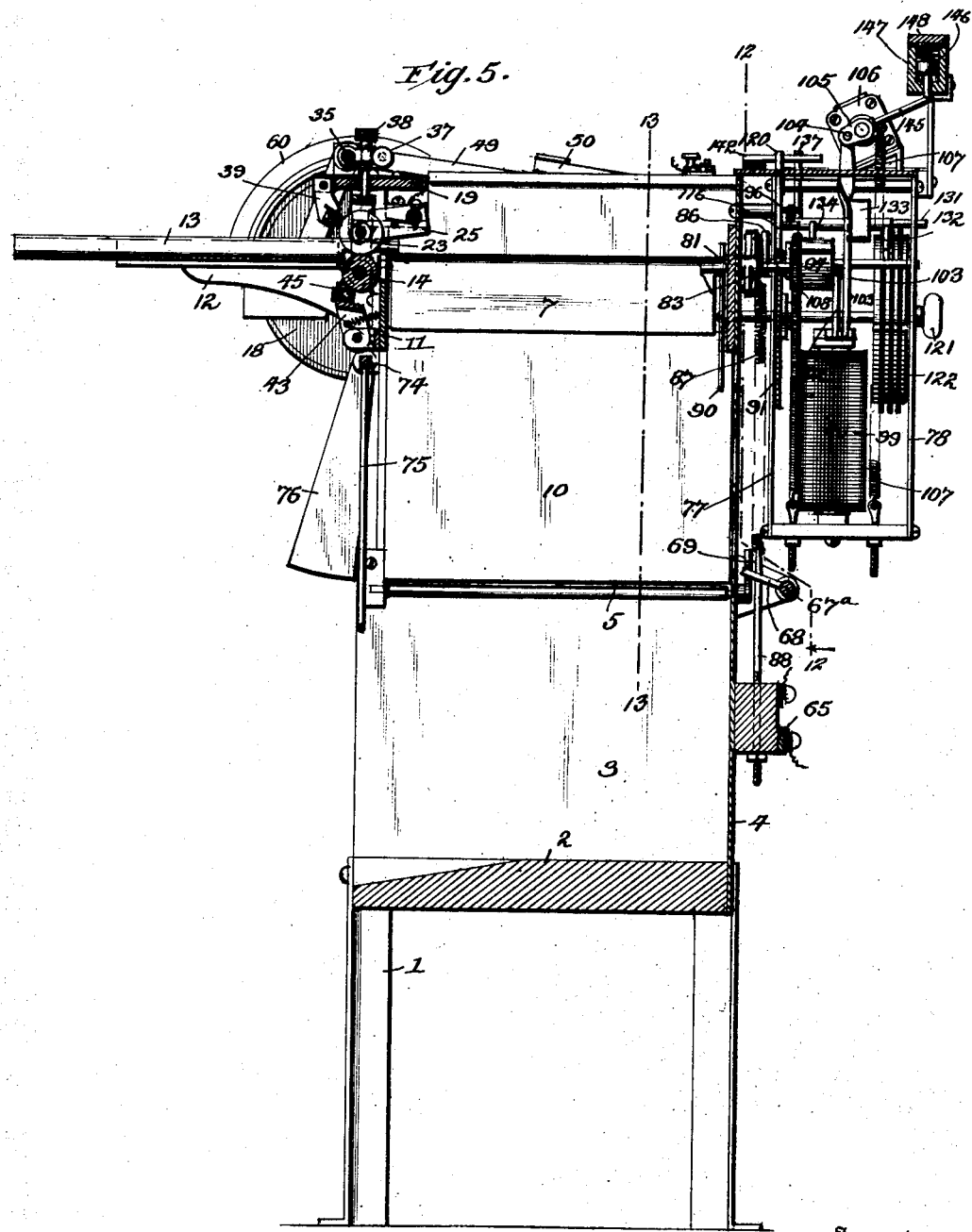

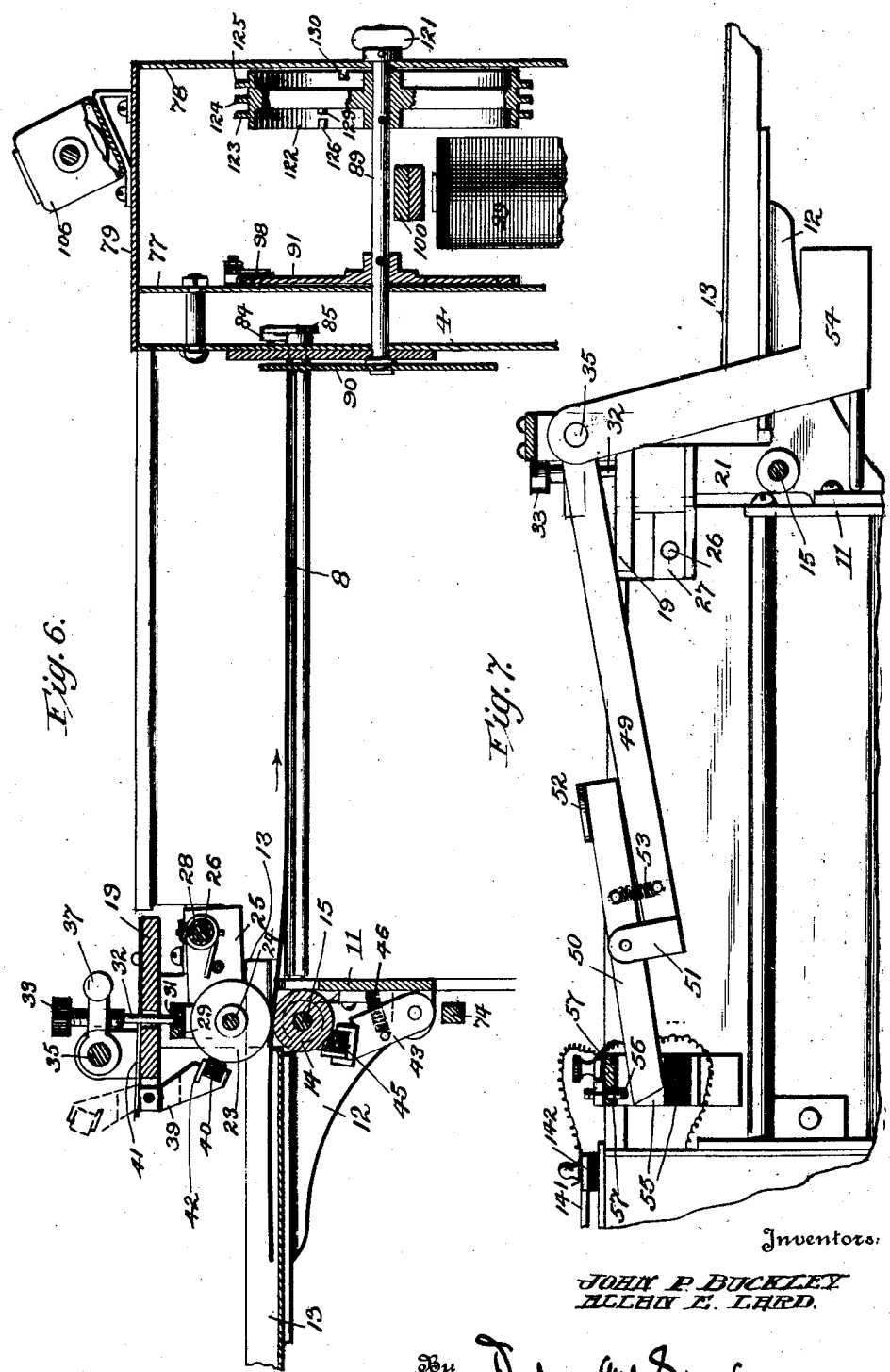

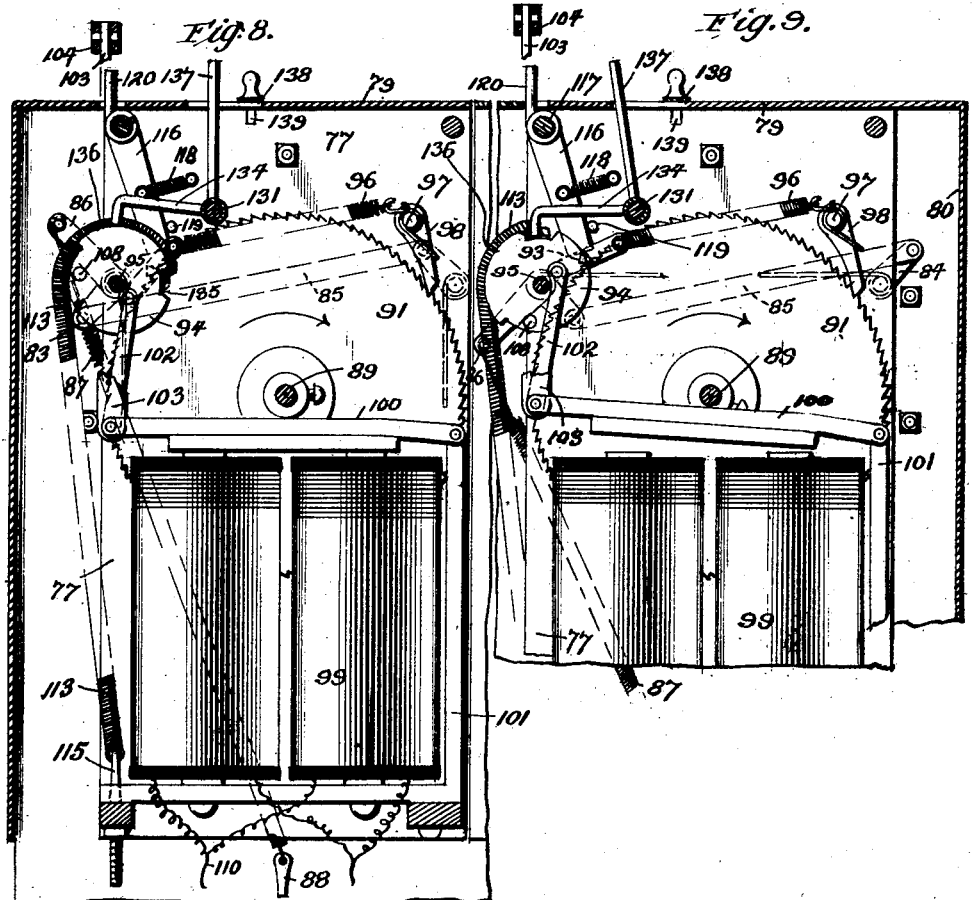
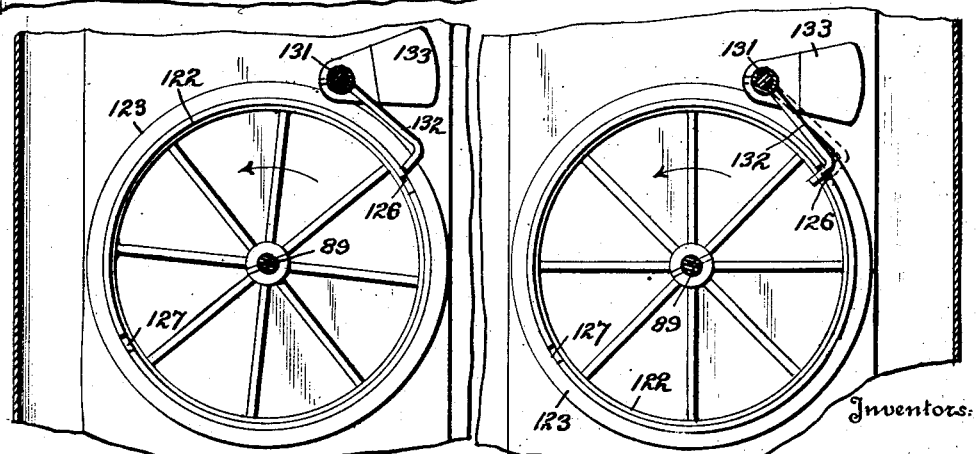

J. P. BUCKLEY AND A. E. LARD.
MACHINE FOR ASSORTING AND COUNTING PAPER MONEY.
APPLICATION FILED JULY 12, 1916. RENEWED JUNE 5, 1919.
1,328,263.
Patented Jan. 20, 1920.
8 SHEETS—SHEET 7.
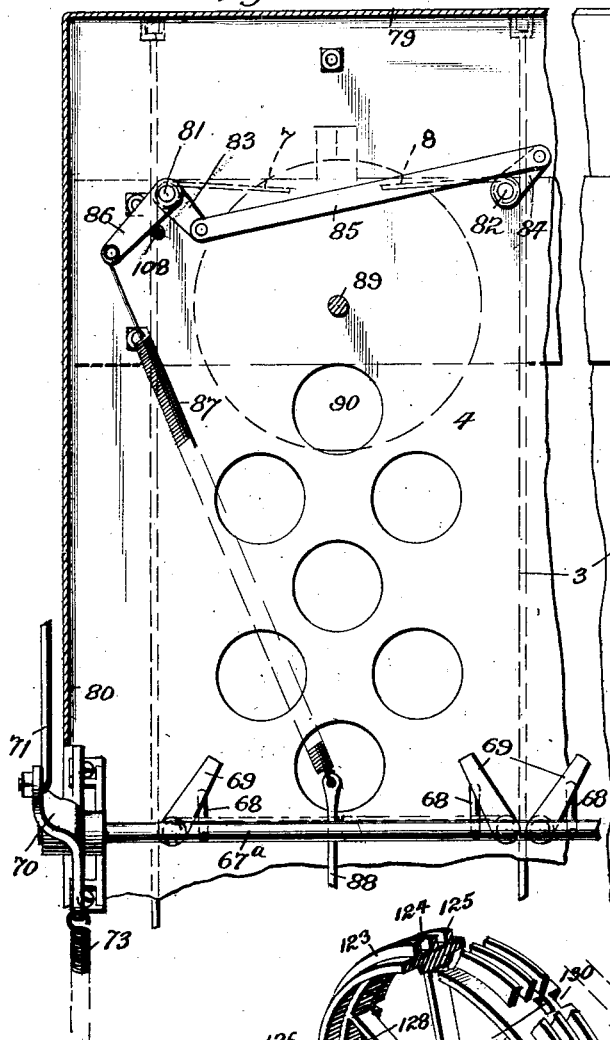
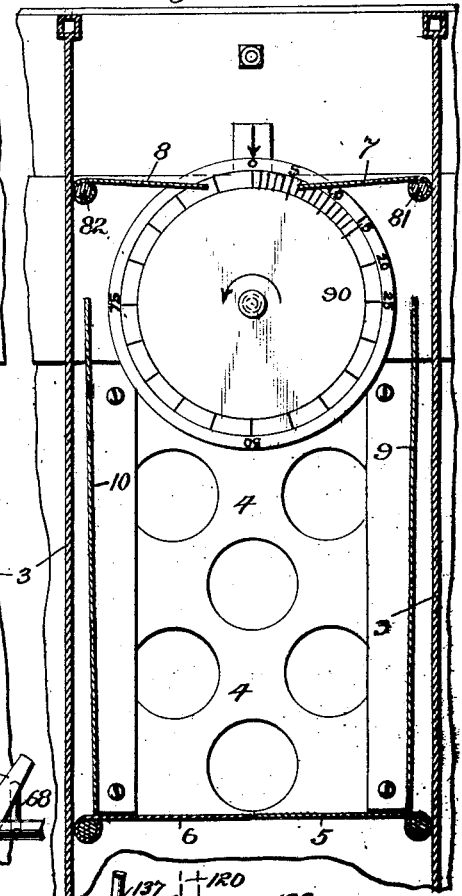
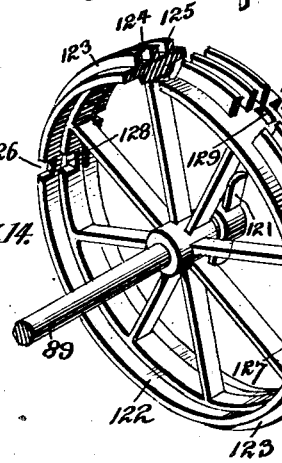
Inventors:
JOHN P. BUCKLEY
ALLAN E. LARD
By Dodge and Sons,
Attorneys.

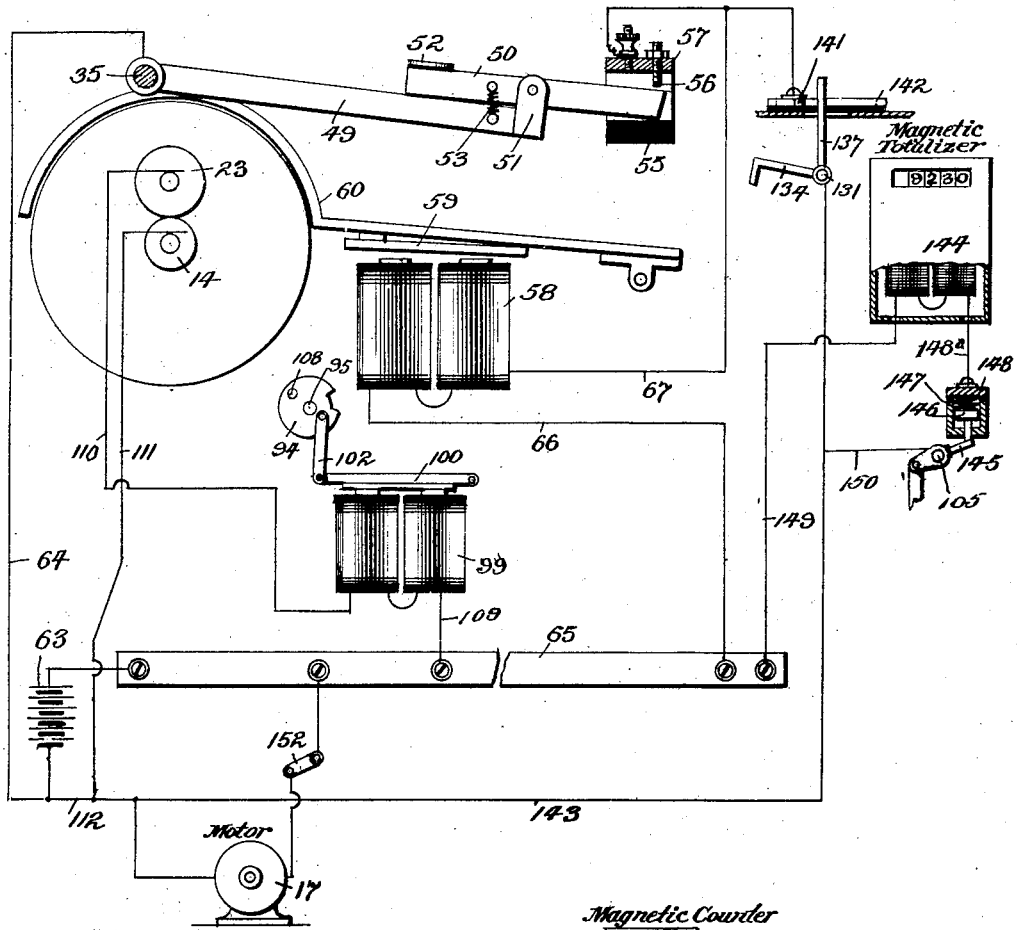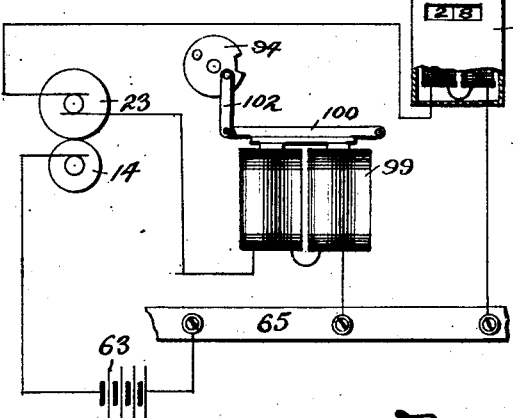

UNITED STATES PATENT OFFICE.

JOHN P. BUCKLEY AND ALLAN E. LARD, OF WASHINGTON, DISTRICT OF COLUMBIA.

MACHINE FOR ASSORTING AND COUNTING PAPER MONEY.

1,328,263.  Specification of Letters Patent.  Patented Jan. 20, 1920.

Application filed July 12, 1916, Serial No. 108,913. Renewed June 5, 1919. Serial No. 301,998.

*To all whom it may concern:*

Be it known that we, JOHN P. BUCKLEY, and ALLAN E. LARD, citizens of the United States, residing at Washington, in the District of Columbia, have invented a certain new and useful Improvement in Machines for Assorting and Counting Paper Money, of which the following is a specification.

This invention pertains to a machine for assorting and counting paper money, and in certain particulars, as will hereinafter appear, is an improvement upon the structure set forth and claimed in Letters Patent No. 1,159,826, granted to John P. Buckley, under date of November 9, 1915.

Paper money, where any considerable amount is handled, is usually banded or wrapped, said band being commonly termed a "strap", and the main object of the present invention is to produce a machine which will sort and count what is termed in banks "mixed" and "straight" money, and at the same time verify the "strap", and lock against further operation until reset, when a predetermined number of bills have been passed into the machine. Bills of different denominations all in one "strap" are termed "mixed" and bills of the same denomination are known as "straight" money. In banking operations the amount of money in the strap is always a multiple of fifty, and the apparatus is designed with this in view.

The machine, of course, is adapted to the sorting and counting of money whether it be initially strapped or not, and has proven highly efficient in large department stores and banks where bills of various denominations and issues are taken in in large numbers and their counting becomes, under the old hand method of first assorting and then counting, a matter of considerable expense, with the ever-present liability of error.

The machine in its preferred form is illustrated in the annexed drawings, wherein:

Figure 1 is a perspective view of the machine as seen from the front and brake end thereof;

Fig. 2 an end elevation of the machine as viewed from the opposite end;

Fig. 3 a sectional elevation of the upper forward portion of the machine, illustrating more particularly the feed rollers and the manner of mounting the same;

Fig. 4 a detail sectional view, showing the manner of mounting the swinging carrier for the upper roll;

Fig. 5 a vertical transverse sectional view of the machine;

Fig. 6 a like view of the upper portion thereof, on an enlarged scale;

Fig. 7 a detail view of the circuit control lever;

Figs. 8 and 9 detail views of the register actuating mechanism, the views showing the parts in different positions;

Figs. 10 and 11 detail elevations of the lock wheel;

Fig. 12 a transverse vertical sectional view on the line 12—12 of Fig. 5, showing the shelf-operating mechanism;

Fig. 13 a like view on the line 13—13 of Fig. 5;

Fig. 14 a detail perspective view of the stop or lock wheel;

Fig. 15 a like view of certain of the operative parts;

Fig. 16 a diagrammatic view of the electric circuits; and

Fig. 17 a like view of the circuits employed under a slightly modified arrangement of the registers.

In the drawings, 1 denotes suitable legs which support a base or bottom 2 from which arise vertically-disposed partition plates 3 and a back plate 4. A pair of hinged leaves 5 and 6 are arranged between each pair of partition plates about the middle of the height thereof, and a second pair of leaves 7 and 8 are arranged adjacent the upper portion of the plates. There are thus formed between each pair of plates or partitions two chambers, an upper or initial stacking chamber with the leaves 5 and 6 forming the bottom thereof, and a lower receiving chamber adapted to receive the bulk from the upper chamber when said leaves 5 and 6 are turned downwardly. Filler pieces 9 and 10, inclining inwardly toward their lower ends, form the side walls of the upper chamber, the inclination providing clearance for the leaves 7 and 8 as they are swung downwardly, and likewise tending to center the bills as they are discharged one by one from the leaves 7 and 8.

A supporting bar 11, see Figs. 3, 5 and 6, is secured to the upper forward portion of the machine and a plurality of brackets 12 are carried thereby.

Secured to the upper face of the brackets and standing in line with the feeding and contact rolls (hereinafter described in detail) are bill receiving or feed plates 13, one plate for each compartment of the machine. Said plates are dished or bowed downwardly and such curvature enables the machine to operate upon old and flimsy bills and to cause them to properly pass into and stack in the machine. Clean or new bills may be handled without difficulty, but the forward or advancing end of old bills tends to turn down or curl over and the bill will not come to proper extended position on leaves 7 and 8 prior to its discharge into the initial stacking chamber. By causing the bill to assume a bowed position it may be fed through the rolls and positioned without difficulty. Plates 13 are cut away centrally and the sides thereof extend inwardly past the feed rolls (Fig. 6), and the lower portion of the main body lies slightly below the top of the lower feed roll 14. This arrangement imparts a longitudinally U-shaped formation to the bills as they are fed in.

The feed rolls 14 are secured upon and rotate with a shaft 15, the shaft being mounted in the brackets 12 and carrying at one end a friction pulley 16, which derives its motion from a motor 17, Fig. 2. A brake drum 18 is secured upon the opposite end of the shaft.

A second supporting bar 19 (see Fig. 3) is secured by screws 20 to upward extensions 21 of brackets 12, spacer-blocks 22 being interposed between the parts.

There is a roller 14 for each compartment, and inasmuch as the other operative parts are duplicated throughout a description of one set alone will be given.

Located directly above roller 14 is a relatively narrow roller 23, said roller turning on an axle 24 mounted in the outer end of a yoke-shaped frame 25, said frame being mounted to swing on a rod or bar 26, the ends of which are secured in blocks 27 of suitable insulating material, the blocks in turn being secured to the bracket extensions 21. A spring 28 serves to rock the frame and to hold gage roll 23 in contact with roller 14 at all times except when a bill is being fed by the rollers.

Mounted on the axle 24 and straddling the roller 23 is a presser-block 29, the block being preferably provided with an oil tube 30 which extends freely through an opening formed in bar 19. The block has mounted in its upper end an insulating bearing plate 31, in which is seated the lower end of a pin or bar 32, the ends of the pin being rounded, the upper extremity finding its bearing in a seat formed in the lower end of an adjusting screw 33. Said screw is threaded into the outer portion of a split arm or lever 34 which is pinned to a shaft 35 which extends across the machine, finding its bearing in posts 36 extending upwardly from bar 19. A clamp screw 37 holds screw 33 in position once its adjustment is effected.

Inasmuch as the rollers are included in the operative electric circuit of the machine, it is essential that they be kept clean, and to this end suitable wipers are provided. Hinged between a pair of lugs 38, extending out from bar 19 is a swinging frame 39, the lower end of which is slotted to receive a piece of felt 40 which bears against roller 23, a spring 41 acting on the frame to urge the felt to the roller. A strip of fiber 42, or other suitable dielectric, is secured in the outer end of the frame, protruding beyond the same slightly so as to prevent the frame from contacting with the roller and short-circuiting the current through the swinging frame. By squaring the upper end of the frame the spring will urge the felt against the roller, and when the frame is turned upwardly, for the purpose of renewing the felt, the spring will maintain it in such position until the frame is again turned down.

A swinging frame 43 is pivotally mounted on a bracket 44 secured to bar 11, the frame carrying a felt wiper 45 which contacts with roller 14. A spring 46 secured to bar 11 and to the frame tends to hold the felt in contact with the roller, or to hold the frame outwardly when the spring passes the pivotal center of the frame.

Suitable guide plates 47 and 48 are attached to bar 19 and extend inwardly over receiving plate 13 to each side of roll-carrying frame 25.

To that end of shaft 35 which stands adjacent brake drum 18, there is secured a two-part lever, composed of the members 49 and 50, member 49 being provided with an upwardly-extending bifurcated lug 51 to which element 50 is pivoted. Member 50 is provided with a finger-piece 52 at its forward end, and a spring 53 serves to normally depress said forward end and hold it in contact with element 49. The lever is provided with a counterweight 54, which does not quite overbalance the same, and thus renders the lever easy of upward movement. The outer end of the lever normally extends into a block 55 of insulating material and directly beneath a contact post 56, mounted in a metallic plate 57 carried by block 55. Normally the rolls are in contact and may be separated the distance equal to the thickness of a bill by the upward movement of roll 23, which movement will be communicated to the lever through the block 29, pin 32, screw 33, lever 34, and shaft 35, thus moving the contact lever 49, 50 but not to such an extent as to throw it into contact with post 56. If, however, two bills pass in between the rolls, the lever will be moved to a greater extent, element 50 being thrown against post 56. By having the lever jointed, member 50 may continue to move upwardly without causing any jamming of the parts, or jamming of the bills between the rollers.

Post 56 is in circuit with a magnet 58, see Fig. 16, the armature 59 of which is secured to the under face of a brake lever 60 fulcrumed on a post 61, Fig. 1, which extends outwardly from the machine frame. The brake lever 60 is provided with a shoe 62 which overlies the brake drum 18, carried by the live roll shaft 15.

The circuit of magnet 58 as shown in Fig. 16 is as follows:

63 is the source of current, one terminal of which is connected or grounded by wire 64 to the frame of the machine or to the shaft 35; the other terminal is connected to a conductor bar 65, which extends along and is insulated from the rear of the machine frame, a lead 66 extending from the bar to the magnet 58. A lead 67 connects the other terminal of the magnet winding with plate 57 in which post 56 is mounted.

As above noted, the parts are so adjusted as to permit the feeding in of a single bill or a bill even though it be partly folded back upon itself, this latter by reason of the impetus or speed of the rollers which allows said doubled portion to pass before the brake can act. Two superposed bills, however, cannot be fed in, as their aggregate thickness will raise the contact lever to such an extent as to complete the circuit, causing the brake to act and arrest the movement of the roll-driving shaft 15, the friction clutch 16 permitting such action while the motor still continues to run.

Running lengthwise of the machine in rear thereof and supported by suitable lugs projecting from the frame, is a shaft 67ª said shaft carrying a series of fingers 68 which extend inwardly and underlie arms 69 secured to the hinge or pivot rods of the leaves 5 and 6, respectively. Shaft 67ª at one end has secured to it (Fig. 2) a lever 70, to which is connected a pull rod 71, which extends up to the upper forward portion of the machine, where it is provided with a handle 72. A spring 73 normally draws lever 70 down, and as a consequence holds fingers 68 and arms 69 elevated and the leaves 5 and 6 in an elevated position. By pulling on the handle the leaves or gates may be swung downwardly and discharge the bills thereon into the lower chamber.

A bar 74 extends across the front portion of the machine, and is journaled in lugs projecting outwardly therefrom. A series of wire guard arms 75, having the form of an inverted loop, are secured to the bar (one for each compartment of the machine), said arms standing in front of the upper compartments and preventing the bills from accidentally passing out of the front of the same. A weight 76, attached to the bar, normally holds the arms in front of the compartments, but said arms may be readily swung up when it is desired to remove the money from the compartments through the front thereof.

Each compartment of the machine is provided with a register and what may be termed an "over" and "under" indicator or dial. Each compartment has also a locking or stop mechanism, which will lock the upper leaves or gates 7 and 8 against further operation when a predetermined number of bills have passed into the machine and past said gates. The machine is also preferably provided with a totalizer for all of the compartments. The mechanism for the various compartments is the same throughout, and but one need be described.

Secured to the machine directly in rear of the compartment is a supporting frame or housing, comprising walls 77 and 78 and a top plate 79, the end housings being likewise provided with end walls 80. The shafts 81 and 82 of the gates or leaves 7 and 8, respectively, extend through the back wall or plate 4 and have connected thereto levers 83 and 84, see Fig. 12, said levers in turn being connected by an interposed link 85. Shaft 81 has secured to it a second arm or lever, 86, to which is connected a spring 87, the spring at its lower end being connected to the upper end of an adjustable rod 88, Fig. 5. The spring tends to draw lever 86 downward and, through the connections just noted, to hold the gates in their horizontal or closed position.

Journaled in the walls 77 and 78 and extending through the rear wall 4 is a shaft 89, said shaft at its inner end and adjacent the front face of wall 4 having secured to it a disk 90, Figs. 6 and 13, which is graduated from 0 to 100. The disk may be denominated the "over and under" indicator, and its purpose will presently appear. Shaft 89 also has pinned to it a ratchet wheel or disk 91, having one hundred teeth and adapted to be advanced the distance of one tooth each time a bill passes into the machine between the rollers. A lever 92, carrying a pawl 93, adapted to engage the teeth of wheel 91, is arranged adjacent said wheel, the lever being pivotally connected at one end to a cylindrical or drum-shaped member 94, secured upon a shaft 95. A spring 96 is connected to one end of lever 92, the opposite end being anchored to a stud 97 protruding from wall 77. A pawl 98, pivoted on the stud, prevents retrograde movement of the disk 91.

Mounted in the housing is an electro-magnet 99, whose armature 100 is pivoted at one end to a fixed post 101, the opposite end of the armature being connected to member 94 by a pitman or link 102. A second pitman 103, see Fig. 5, extends upwardly from the armature and is connected through lever 104 to the rock-shaft 105 of a register 106. A spring 107 is connected to the other end of the lever and tends to draw the lever down. When, however, the magnet is energized the parts are in the positions shown in Fig. 8 (their normal position to receive a bill) and the spring is under stress.

Member 94 is provided with an outwardly-extending pin 108, see Figs. 12 and 15, which underlies the lever 86 and serves to move said lever upwardly, and through the connections described, to normally hold the gates open, which position obtains until a bill is passed in between the rollers and the magnet deënergized.

The circuit in which the rolls and magnet 99 are included will be seen upon reference to Fig. 16. A lead 109 extends from bar 65 to magnet 99, the current passing therefrom through wire 110 to roll 23, thence through said roll to roll 14 which is connected by wire 111 and line 112 to the battery 63. So long as the rolls are in contact the current flows through the magnet and the armature is held down; consequently, the gates 7 and 8 are held open or thrown downwardly. The instant, however, a bill passes between the rolls, the current is interrupted, the magnet deënergized, and the gates thrown upwardly through partial rotation of member 94, the parts coming to the positions shown in Fig. 9, and the register 106 is actuated. This movement is effected through the action of spring 87 and a spring 113, which has one end secured to member 94, said member being provided with a peripheral groove 114, Fig. 15, to seat the spring, the lower end of the spring being secured to an adjustable stem 115.

It is to be noted that the gates may be held open and yet the member 94 will actuate the parts, a condition which may possibly arise if a bill should happen to be caught between the gates, or when assorting old money, which will not lie flat, the stack becomes so high as to interfere with the operation of the gates.

As the member 94 is moved by the springs, pawl 93, which had been drawn rearwardly over one tooth of disk 91, will advance the disk the distance of one tooth, and the graduated disk 90 will also be advanced. The effective counting operation, it is to be noted, is effected by the action of the springs, and overthrow is not as liable to take place as when the count is effected by the action of the armature, as in the patent above specified.

To prevent any possibility of overthrow and to lock the disk 91 from being otherwise accidentally turned, a locking or overthrow-preventing lever 116 is provided. Said lever is fulcrumed at 117, the lower end overlying pawl 93 (see Fig. 15), in which position it is maintained by a spring 118. A stop pin 119 limits the movement of the lever and holds it in proper relation to the pawl. A finger-piece 120 extends upwardly from the lever through the top plate 79.

Shaft 89 extends through the rear wall 78 and is provided with a turn button 121, Fig. 5, through which the shaft may be turned and the parts carried thereby brought to the desired position for a purpose which will presently appear. Before the shaft may be turned, it is necessary to throw the lever 116 clear of the pawl by manipulation of the finger-piece 120 and to hold it against the action of spring 118. Shaft 89 also has secured to it a stop wheel 122, the periphery of which in the present instance is provided with three circumferential ribs 123, 124 and 125, thus dividing the periphery or rim into four spaces or bands, which extend around the rim. This wheel will, of course, make one complete revolution for each hundred bills introduced through the rollers, but inasmuch as it is oftentimes desirable to place a certain number of bills of a given denomination in straps, it is desirable to lock the machine when said predetermined number have passed in. To this end the first band or run is provided with two diametrically-disposed openings, 126 and 127, which will cause the wheel to lock when fifty bills have passed in; the next run is provided with but a single opening 128, and the wheel will make a complete revolution and only lock when one hundred bills are passed in; the next run is provided with four openings 129, and the wheel will be arrested every time twenty-five bills are passed in; the fourth run is provided with five equally-spaced openings 130, and the wheel will be locked at each opening or each time twenty bills are passed in between the rollers.

To effect a locking of the wheel, the following mechanism is employed: A rocker shaft 131, the ends of which are reduced so that it may be shifted endwise in the bearings in the walls 77 and 78, is located above said stop wheel and is provided with a hook-shaped finger 132, the end of which is designed to bear upon one or another of the bands or runways of the wheel, and to drop into one or another of the openings when they come into line therewith. A counterweight 133, secured to the shaft, normally depresses the finger. A second hook-shaped finger 134 is secured to the shaft, the end thereof overlying member 94. Said member is provided with a longitudinally-extending peripheral groove 135, one wall of which is rounded off slightly and merges into a cam face 136, Fig. 15. A finger 137 extends upwardly from the shaft through an opening formed in top plate 79, by which the shaft may be rocked and likewise shifted endwise to bring finger 132 into relation with any one of the runs desired.

Assuming that it be desired to count fifty bills, say fifty ones, the operator will first shift finger-piece 120 to permit the toothed disk 91 to be rotated so that the opening 126 or 127 may be brought into line with the finger 132. This position is readily determined by noting that the finger-piece 120 stands vertically, or by noting that the zero point on the under and over register 90 stands opposite the pointer, Fig. 13. At such time the parts will be in the positions shown in Fig. 8, with finger 134 resting on face 136, whereby finger 132 will be held slightly above the surface of the underlying rim of the stop wheel, as indicated in dotted lines, Fig. 11. Passage of a bill between the rollers breaks the circuit and causes disk 91 to advance a tooth, as above set forth, and this operation continues until fifty bills have passed in, at which time finger 132 will drop into opening 126 (or 127) and finger 134 passes into groove 135. Finger 134 thus locks the parts against further rotation, and inasmuch as pin 108 is moved downwardly spring 87, acting through lever 86, will cause the gates 7 and 8 to come to their closed or horizontal position, and should the operator present one or more bills to the rolls they could not be fed thereby, for the rolls will be arrested at such time in a manner hereinafter set forth.

To prevent accidental longitudinal shifting of the rock shaft 131 through the finger 137 when said finger is thrown to release position after having been automatically brought to lock position upon the completion of the count, a stop arm 138 is provided, said arm being pivotally secured at one end on the top plate 79. The arm is formed of spring metal and carries at its outer end a lug 139 adapted, when the arm is brought to position, to enter an opening in plate 79 and prevent shifting of the arm. The arm overlies the opening through which finger 137 extends to such an extent as to prevent the rock shaft 131 from being turned to such a distance as to allow finger 132 to clear the ribs on the stop wheel. When the stop arm is shifted laterally, finger 132 may be tilted to its full extent and consequently shaft 131 may be moved laterally to bring finger 132 into line with any run on the stop wheel, after which the stop arm will be shifted to its locked position. Suitable numbers will be placed on top plate 79 to facilitate the adjustment of the finger 137, and consequently the finger 132, with reference to the runs on the stop wheel. Stop arm 138 will be provided with an opening 140 near its free end, and the finger 137 may be passed through the same and the arm locked, whereby the stop wheel will be thrown entirely out of operation, this when the operator is merely assorting money, and no limit on the number of bills being fed into any compartment is necessary.

When a predetermined number of bills have been fed into the machine, say twenty-five, fifty or one hundred, as the case may be, according to the adjustment of the parts, it is desirable to arrest the feed rolls and the fingers 137 may be utilized to effect this. When the predetermined number of bills have been counted finger 137 moves from the left to the right and by arranging contact fingers 141 at the right of the opening through which the fingers 137 extend, the brake may be brought into operation. Said fingers 141 extend from a conductor bar 142, which is insulated from and extends lengthwise of the top plate 79. Bar 142 is connected to lead wire 67, while finger 137 is connected by a line wire 143 to line 112 which leads to the source of current 63. The brake magnet 58 is thus included in the circuit, and when finger 137 closes the same, upon the completion of the count of a predetermined number of bills, the feed rolls will be automatically arrested through the action of the brake.

The grand totalizer is indicated by 144, and is preferably of the magnetic type. Extending rearwardly from lever 104 is an arm 145, see Figs. 2 and 5, said arm underlying a spring-pressed plunger 146 mounted in a non-magnetic casing 147 which is co-extensive of the registers 106. A contact bar 148 is carried by the casing and is in circuit with the magnet of the totalizer 144 through lead wire 148ª, Fig. 16, the other side of the magnet being connected to conductor bar 65 by a wire 149. The circuit is completed by a wire 150 extending from shaft 105. From this it will be seen that for each actuation of each of the registers 106 an actuating impulse will be imparted to the totalizer 144.

It is conceivable that instead of employing mechanically-actuated registers or counters, as 106, magnetically-operated counters may be employed. Such an arrangement is illustrated in Fig. 17, wherein the lower roll is connected to one side of the battery and the upper roll is connected to the opposite side through a magnetic counter 151 and magnet 99.

The machine is designed to be driven through the use of the usual 120 volt current. The motor 17 will be controlled by a switch 152 located at any convenient point on the machine.

To prevent arcing of the current between the rolls suitable resistance will be placed in the line, as otherwise the rollers would become oxidized and pitted and the effectiveness of the machine impaired.

While in Fig. 1 a three-compartment machine is illustrated, it is to be understood that any number of compartments may be present, and preferably seven will be employed. When counting mixed money the two left-hand compartments will be for ones, good and bad, and the counters will register 1, 2, 3, etc. The next two compartments will be for twos, good and bad, and the counters will register 2, 4, 6, etc. The last three compartments will be for fives, tens and twenties, the counters registering, respectively, 5, 10, 15, etc.; 10, 20, 30, etc., and 20, 40, 60, etc. These counters will preferably have only two figures and when 100 is reached they will register 00, this being all that is needed in order to verify the strap. The amount of money in the strap is always a multiple of fifty.

When the operator starts to sort and count a large amount of mixed money, he first sets all the counters to zero and then feeds the bills one at a time through the rollers to their respective compartments. When the last bill of the first strap is in, he takes a mental note of the seven compartments. If the last two figures of the total is 00 or 50 the strap is correct. If it is not 00 or 50 there is an error and as the money is all "above", that is in the upper part of the compartment, resting on gates 5 and 6, it can be removed and counted by hand, and by reference to the initials on the strap the name of the party who made the mistake may be ascertained. If, however, the strap proves to be correct, the money is dumped below, that is, to the lower chamber, through the manipulation of the handle 72, leaving the upper chamber clear to receive the money from the various straps until the entire batch of money is counted. If any compartment should lock while the operator is in the midst of a strap, he drops in upon the money a metal separator (about the size of a bill), unlocks the compartment and goes on until the last bill of the strap is fed to the machine, when he verifies the strap and dumps as before. In this way the operator is enabled to have a predetermined number of bills in his own strap or package, and at the same time verify the original strap or package. It will be necessary, therefore, when the predetermined stack of bills is taken out from the lower chamber (to be banded) to put back in the lower compartment all the money on the upper side of the separator, so that the required number of bills to make a predetermined amount can be contributed from the succeeding strap or straps. As fast as the lower compartments are filled the money between and below the separators is taken out and banded with straps printed to correspond with the different denominations, it being understood that all the bills above the last separator are to be put back into the machine for the reason above stated.

The grand total of a batch of money is ascertained by counting the packages and adding thereto the odd bills. By odd bills is meant a number over or under the predetermined number, and these odd bills will be registered on the dials or disks 90. For instance, if the predetermined number of ones is fifty and the dial registers twenty-five or seventy-five the odd number is twenty-five, under and over, respectively. Thus it will be seen that no hand count is required in order to verify the total of any amount of money, this being done entirely by the machine.

Some banks make various assortments, other than separating the different denominations. For instance, the tens are sorted Gold, Silver, Legal, National and Federal Reserve Bank Notes. If this assortment is desired in a batch of mixed money, the locking fingers 132 on the 5, 10 and 20 compartments of the machine are thrown out of operation in the sorting or "breaking down" operation by passing the members 137 through the holes in the stop arms 138. To then sort the separated fives, tens and twenties as noted above, a separate operation is required for each, and the locking fingers 132 are again put into operation by releasing members 137 from stop arms 138. In these assortments the counters over the compartments are disregarded, the grand total being obtained by counting the number of packages plus the odd bills registered on the totalizer. In this assortment the predetermined number of bills is the same for each compartment.

When sorting and counting straight strapped money the totalizer is connected up and the counters over each compartment are disregarded. As each bill registers one unit the last two figures of the totalizer must always read 00 or 50; otherwise there is an error in the strap. Strapped straight money is likewise put up in multiples of fifty.

From the above it will be apparent that the machine will accommodate itself to every phase of sorting, counting and packaging paper money.

On the concave feeding plate of every compartment may be pasted, temporarily, a bill to correspond with the one which belongs to that compartment. In this way like is fed upon like, and errors are avoided.

While the machine is especially designed for the handling of bills (money) it is evident that it may be employed for counting or assorting sheets.

Having thus described our invention, what we claim is:

1. In a machine for counting paper money, the combination of feeding means adapted to feed bills; means controlled by said feeding means to arrest said feeding means when more than a single bill is introduced thereto at the same time; and a register associated with and controlled by said feeding means and operable only when a single bill is passed by said feeding means.

2. In a machine for counting paper money, the combination of feeding means adapted to feed bills; a magnetically-controlled brake adapted to arrest said feeding means when more than a single bill is simultaneously introduced thereto; and an associated register actuated only when a bill is passed by the feeding means.

3. In a machine for counting paper money, the combination of a pair of normally contacting feed rolls for the bills to be counted; means for arresting the feeding action of said rolls when two or more bills are simultaneously introduced thereto; and an electrically-actuated register controlled by said feed rolls.

4. In a machine of the character specified, the combination of a pair of normally contacting feed rolls; a yielding support for one of said rolls; an electrically-actuated brake for the driven roll of the pair; and a circuit-closer for the brake operated by said yielding support.

5. In a machine of the character specified, the combination of a driven roll; a second roll coöperating therewith; a yielding support for said roll; an electrically-controlled brake for arresting the movement of the driven roll; and a circuit-closer for said brake controlled by the yielding support aforesaid.

6. In a machine of the character specified, the combination of a driven roll; a second roll coöperating therewith; a yielding support for said second roll; an electrically-controlled brake for arresting the movement of the driven roll; a contact lever adapted to close the circuit of the brake; and adjustable actuating means for the lever interposed between said lever and the yielding support.

7. In a machine of the character specified, the combination of a driven roll; a second roll coöperating therewith; a yielding support for said second roll; an electrically-controlled brake for arresting the movement of the driven roll; a two-part yielding lever adapted to close the circuit of the brake; and adjustable actuating means interposed between said lever and the yielding support aforesaid.

8. In a machine of the character specified, the combination of a driven feed roll; a gage roll coöperating therewith; a brake for arresting said driven roll; and means for actuating said brake when the gage roll is moved away from the feed roll a predetermined distance.

9. In a machine of the character specified, the combination of a pair of rolls adapted to feed a bill, said rolls being relatively movable toward and from each other; means for driving one of said rolls; and means for arresting the feeding action of said rolls when separated beyond a predetermined extent or degree.

10. In a machine of the character specified, the combination of a pair of rolls adapted to feed bills one at a time, said rolls being relatively movable toward and from each other; adjustable means for limiting the extent of such separation; a constantly rotating motor for driving one of said rolls; and means for arresting the feeding action of said rolls when the rolls are separated to the predetermined extent of movement.

11. In a machine of the character specified, the combination of a driven feed roll; a swinging frame; a second roll mounted in said frame; a rock-shaft located to one side of the frame; an adjustable connection between said frame and the rock-shaft; an electrically-actuated brake associated with the driven roll; and a lever extending from the rock-shaft, said lever, when the rock-shaft is turned through the movement of the second roll and frame away from the feed roll to a predetermined extent, likewise moving and closing the circuit of the electrically-actuated brake.

12. In a machine of the character specified, the combination of a driven feed roll; a second roll; a swinging supporting frame for said second roll; a bearing block carried by the frame; a rock-shaft located above said block and frame; a lever extending outwardly from the rock-shaft; a pin bearing on the block; a screw mounted in the lever and bearing on the upper end of the pin; an electrically-actuated brake associated with the driven roll; and a jointed lever extending from the rock-shaft, adapted when the second roll is moved away from the driven roll beyond a predetermined extent or degree, to close the circuit of the brake.

13. In a machine of the character specified, the combination of means for feeding bills; and a fixed receiving plate bowed transversely to the line of feed and located in front of the feeding means for presenting the bills to the feeding means.

14. In a machine of the character specified, the combination of means for feeding bills; and means for bowing the bills transversely of the line of feed as they are presented to said feeding means.

15. In a machine of the character specified, the combination of a pair of feeding rolls the upper one whereof is relatively narrow; and a fixed concave bill-receiving plate located in front thereof.

16. In a machine of the character specified, the combination of a driven feed roll; a relatively narrow roll located above and coöperating therewith; and a fixed concave bill-receiving plate located in front of said rolls, the concavity of the plate extending transversely of the line of feed.

17. In a machine of the character specified, the combination of a pair of feed rolls; a variable stop mechanism for setting the machine to feed a predetermined number of bills; and a brake for the feed rolls, associated with said stop mechanism, acting to arrest the rolls when the predetermined number of bills has been fed.

18. In a machine of the character specified, the combination of a pair of feed rolls; a variable stop mechanism for setting the machine to feed a predetermined number of bills; a temporary support for holding each bill as it is fed; a brake for the feed rolls; and an electric circuit adapted to be closed by the stop mechanism to actuate the brake.

19. In a machine of the character specified, the combination of a pair of feed rolls; an electrically-actuated brake associated therewith; a variable stop mechanism for setting the machine to feed a predetermined number of bills; and an electric circuit in which the brake is included, adapted to be closed by the stop mechanism when the predetermined number of bills has been fed.

20. In a machine of the character specified, the combination of a pair of feed rolls; an electrically-actuated brake adapted to arrest the movement thereof when more than one bill at a time is introduced between the rolls; a variable stop mechanism for setting the machine to feed a predetermined number of bills; and an electric circuit in which the brake is included, adapted to be closed by the stop mechanism when the predetermined number of bills has been fed and thus to arrest the feed rolls.

21. In a machine of the character specified, the combination of a pair of feed rolls; an electrically-actuated brake adapted to arrest the movement thereof when more than one bill is introduced thereto at a time; a lock wheel, said wheel being provided with a series of spaced openings, the openings in one series being spaced differently from those in the others; an adjustable locking finger adapted to be brought into operative relation with one or another of said series; and an electric circuit in which the brake is included, adapted to be completed upon the locking of the lock wheel by the locking finger.

22. In a machine of the character specified, the combination of a pair of feed rolls; an electrically-actuated brake adapted to arrest said rolls when more than a single bill is introduced between the same; a wheel or drum-shaped member having a series of peripheral runs thereon, each run having one or more spaced openings therein; a longitudinally-shiftable rocker-shaft located adjacent said member; a locking finger carried by said shaft with the end thereof overlying one or another of said runs; means for advancing the wheel-shaped member one step each time a bill is passed between the rolls; and means for energizing the brake magnet when the finger passes into one of the openings in the wheel.

23. In a machine of the character specified, the combination of a pair of feed rolls; an electrically-actuated brake adapted to arrest said rolls when more than a single bill is introduced between the same; a wheel or drum having a series of peripheral runs thereon, each run having one or more spaced openings formed therein; a longitudinally-shiftable rocker-shaft located adjacent said drum; a finger extending from the shaft and adapted to overlie one or another of said runs; a ratchet-wheel secured to the drum shaft; an electromagnet; a circuit including said magnet and the rolls, said magnet being deënergized upon the passage of a bill between the rolls; a member mounted to oscillate; actuating connections between said member and the armature of the magnet; a pawl meshing with the ratchet-wheel; a lever connected to said member and carrying the pawl; a second finger carried by the rocker-shaft and contacting with said oscillating member; said member being provided with a longitudinally-extending peripheral groove and with a camming surface adjacent thereto; a spring serving to turn the oscillating member in opposition to the magnet; and an adjusting finger extending upwardly from the rocker-shaft, said finger completing the brake circuit when the finger which coöperates with the drum drops into one of the openings therein.

24. In a machine of the character specified, the combination of a pair of feed rolls; an electrically-actuated brake therefor; a variable stop mechanism, comprising a stop wheel having spaced openings therein; a longitudinally-shiftable rocker-shaft; a locking finger carried by the shaft and coöperating with the stop wheel; a finger extending outwardly from the shaft; and a shiftable arm for maintaining said last-named finger in its adjusted position, said arm being provided with an opening through which the last-named finger may be passed to hold the stop mechanism entirely out of operation.

25. In a machine of the character specified, the combination of a plurality of compartments; means associated with each compartment for feeding bills thereto, one at a time; an electrically-actuated brake common to such feeding means and serving to arrest the same upon the passage of two or more bills into the feeding means; a register for each compartment; and a totalizing register for all of the compartments.

26. In a machine for counting paper money, the combination of an electric circuit; a pair of rolls included in the circuit and normally closing the same; a support located adjacent said feed rolls and adapted to temporarily hold a bill as it is deposited thereon by the feed rolls; a counter; an electro-magnet included in the circuit aforesaid; an armature associated with the magnet; connections between said armature and the temporary support for the bills, and between said armature and the counter; and an adjustable stop device to lock the machine when a predetermined number of bills has been passed into the machine.

27. In a machine of the character specified, the combination of means for feeding bills; fixed means for imparting a longitudinal U-form to the bills; and a compartment for receiving said bills as they pass from said feeding means in such U-shaped form.

28. In a machine of the character specified, the combination of means for feeding bills; fixed means associated therewith to bow the bill longitudinally and to thereby stiffen the same; and a compartment designed to receive the bills after they pass from the feeding means.

29. In a machine of the character specified, the combination of a pair of feed rolls; and a U-shaped feed plate, the plate being cut away at its center and extending inwardly at its sides to a point beyond the rolls.

30. In a machine of the character specified, the combination of feeding means adapted to feed bills; means to arrest said feeding means when more than a single bill is introduced; a plurality of compartments into which said bills are discharged; movable gates located in said compartments above the floor of the same; and manually-controlled means for opening said gates.

31. In a machine for counting paper money, the combination of a constantly rotating motor; a pair of normally contacting feed rolls for the bills to be counted; and a friction drive between said motor and one of the rolls acting to allow the roll to come to rest when more than one bill is introduced between the rolls.

32. In a machine for counting paper money, the combination of a constantly rotating motor; a pair of normally contacting feed rolls for the bills to be counted; a constantly rotating motor; a friction driving element interposed between said motor and one of said feed rolls; and a brake acting to arrest the movement of said roll when more than a single bill passes inwardly between said rolls.

33. In a machine for counting paper money, the combination of a constantly rotating motor; a pair of normally contacting feed rolls for the bills to be counted; a constantly rotating motor; a friction driving element interposed between said motor and one of said feed rolls; a brake acting to arrest the movement of said roll when more than a single bill passes inwardly between said rolls; and a register adapted to be actuated upon the complete passage of a bill between said rolls.

In testimony whereof we have signed our names to this specification.

JOHN P. BUCKLEY.
ALLAN E. LARD.